United States Patent
Morse et al.

(10) Patent No.: US 6,359,630 B1
(45) Date of Patent: Mar. 19, 2002

(54) GRAPHICS SYSTEM USING CLIP BITS TO DECIDE ACCEPTANCE, REJECTION, CLIPPING

(75) Inventors: Wayne Morse, Fremont; Michael F. Deering, Los Altos; Mike Lavelle, Saratoga; Ewa Kubalska, San Jose; Huang Pan, Saratoga; Scott R. Nelson, Pleasonton, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/332,734

(22) Filed: Jun. 14, 1999

(51) Int. Cl.[7] ............................................... G06T 15/30
(52) U.S. Cl. ...................................................... 345/620
(58) Field of Search .................................. 345/434, 620, 345/622

(56) References Cited

U.S. PATENT DOCUMENTS

| | | | |
|---|---|---|---|
| 4,888,712 A | | 12/1989 | Barkans et al. |
| 4,901,064 A | | 2/1990 | Deering |
| 5,159,665 A | * | 10/1992 | Priem et al. ................ 345/434 |
| 5,297,240 A | * | 3/1994 | Priem et al. ................ 345/434 |
| 5,396,585 A | * | 3/1995 | Fujii et al. .................. 345/434 |
| 5,517,611 A | | 5/1996 | Deering |
| 5,668,979 A | * | 9/1997 | Lawless et al. ............ 345/568 |
| 5,720,019 A | * | 2/1998 | Koss et al. ................. 345/434 |
| 5,982,380 A | * | 11/1999 | Inoue et al. ................ 345/620 |
| 6,052,129 A | * | 4/2000 | Fowler et al. .............. 345/434 |
| 6,144,387 A | * | 11/2000 | Liu et al. ................... 345/620 |
| 6,169,554 B1 | * | 1/2001 | Deering ...................... 345/434 |

OTHER PUBLICATIONS

Bjernfalk, "The Memory System Makes The Difference," © 1999 Evans & Sutherland Computer Corporation, pp. 1–11.
Foley et al., *Computer Graphics, Principles and Practice, 2nd Edition in C*, Addison–Wesley Publishing Co., Inc. 1996, 1990, pp. 124–127.

* cited by examiner

Primary Examiner—Jeffery Brier
Assistant Examiner—Ryan Yang
(74) Attorney, Agent, or Firm—Conley, Rose & Tayon PC; Jeffrey C. Hood

(57) ABSTRACT

A method and computer graphics system for clip testing using clip bits stored in a general-purpose register for each vertex of a geometric primitive. In one embodiment, a rendering unit or other processor sets bits in a clip bits register for each vertex of a geometric primitive. Each bit indicates whether the vertex is inside or outside of a clipping boundary with respect to a particular clipping plane. A frame buffer controller or other graphics processor performs clip testing on the entire geometric primitive by performing Boolean operations on the clip bits. The frame buffer controller may trivially accept or trivially reject the primitive based on the clip testing. If the primitive cannot be trivially rejected or trivially accepted, then the frame buffer controller sends an interrupt to the rendering unit. The rendering unit reads an exception register to determine that the reason for the interrupt is the need to clip the primitive. The rendering unit reads the vertices from the frame buffer controller, clips the primitive, and sends the new vertices to the frame buffer controller. The frame buffer controller clears the interrupt and resumes its graphics processing.

96 Claims, 6 Drawing Sheets

GRAPHICS SYSTEM USING CLIP BITS TO DECIDE ACCEPTANCE, REJECTION, CLIPPING

BACKGROUND OF THE INVENTION

1. Field of the Invention

This invention relates generally to the field of computer graphics and, more particularly, to high performance graphics systems.

2. Description of the Related Art

A computer system typically relies upon its graphics system for producing visual output on the computer screen or display device. Early graphics systems were only responsible for taking what the processor produced as output and displaying it on the screen. In essence, they acted as simple translators or interfaces. Modem graphics systems, however, incorporate graphics processors with a great deal of processing power. They now act more like coprocessors rather than simple translators. This change is due to the recent increase in both the complexity and amount of data being sent to the display device. For example, modem computer displays have many more pixels, greater color depth, and are able to display more complex images with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, for example, the CPU may send a request to the video card stating, "draw a box at these coordinates." The graphics system then draws the box, freeing the processor to perform other tasks.

Generally, a graphics system in a computer is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore far more efficient at graphics operations than the computer's general-purpose central processor. While early graphics systems were limited to performing two-dimensional (2-D) graphics, their functionality has increased to support three-dimensional (3-D) wire-frame graphics, 3-D solids, and now includes support for three-dimensional (3-D) graphics with textures and special effects such as advanced shading, fogging, alpha-blending, and specular highlighting. Furthermore, graphics systems typically include many specialized processing units to handle the various tasks involved in processing complex 2-D and/or 3-D graphical data.

Rendering, the process of creating images from graphical data, is a time-consuming operation. Graphical data may comprise one or more graphics primitives. As used herein, the term "graphics primitive" includes polygons, parametric surfaces, splines, NURBS (non-uniform rational B-splines), sub-divisions, surfaces, fractals, volume primitives, and particle systems. These graphics primitives are described in detail in the textbook entitled *Computer Graphics: Principles and Practice* by James D. Foley, et al., published by Addison-Wesley Publishing Co., Inc., 1996. A large number of calculations are required to render the various properties of a primitive, including coordinate and color data. To increase performance, it is therefore desirable to reduce the number of primitives which are rendered. Clipping is one means of reducing the expense of rendering by rejecting primitives and portions of primitives which lie outside a clipping boundary. The clipping boundary is defined by a viewport, which, as used herein, is a region in two or three dimensions which defines an area that is to be displayed. A clipped portion of an object is typically discarded from the graphics pipeline and therefore not rendered.

Clip testing is an operation that often occurs prior to clipping itself, or as the first step in clipping. Clip testing involves determining if a geometric primitive is entirely inside the clipping boundary so that it can be trivially accepted, if it is entirely outside the clipping boundary so that it can be trivially rejected, or if it needs to be clipped. Clip testing further reduces the expense of rendering by eliminating unnecessary and time-consuming clipping operations.

Previous approaches have not efficiently used the multiple, specialized processing units of a graphics system for clipping and clip testing. A graphics system with improved clipping and clip testing capabilities is therefore desired.

SUMMARY OF THE INVENTION

The present invention comprises a computer graphics system which employs an improved method of clip testing using one clip register per vertex and/or using multiple processing units. In one embodiment, the graphics system may include multiple processing units such as one or more rendering units and/or one or more frame buffer controllers. The frame buffer controller may be comprised in a conventional frame buffer or a super-sampled frame buffer (i.e., a sample buffer).

The graphics system processes graphical data for display on a display device. A display screen of the display device displays the contents of a viewport which is defined by a regular clipping boundary. In one embodiment, six planes, that is, two opposing planes for three dimensions, may define the regular clipping boundary. An additional guard band clipping boundary may encompass two dimensions and may therefore be defined by four planes.

In one embodiment, clip testing is the task of determining whether a geometric primitive is to be clipped or not clipped. Three possible outcomes of clip testing are trivial rejection, trivial acceptance, and the need to clip. Trivial rejection is the determination that a geometric primitive lies wholly outside the viewport and should therefore be discarded. Trivial acceptance is the determination that a geometric primitive lies wholly inside the viewport and is therefore to be kept for further processing. If a geometric primitive is not trivially rejected or trivially accepted, then it is clipped.

In one embodiment, a processor such as a rendering unit tests the vertices of a geometric primitive against the various planes of the clipping boundary and sets the bits in one or more clip bits registers accordingly. The rendering unit sets the bits in the clip bits register on a per-vertex basis: that is, without analyzing the relationship of the geometric primitive as a whole to the clipping boundary.

In one embodiment, the clip bits register (also referred to as a clip register) is a general-purpose, 32-bit status register which may contain clip bits information for a vertex of a geometric primitive. In one embodiment, each vertex of a geometric primitive has its own 32-bit clip bits register. The clip bits register may comprise ten bits: six for the six regular clipping planes (x, y, z) and four for the four guard band clipping planes (x, y). Each bit in the registers is set to "1" if the vertex is outside the clipping boundary with respect to a particular clipping plane or "0" if the vertex is inside the clipping boundary with respect to the particular clipping plane. Various embodiments may include additional rules to handle boundary situations. In various embodiments, each vertex may have up to eight additional bits to indicate whether the vertex is inside or outside of model clipping planes. Model clipping planes are additional clipping planes which may be located arbitrarily in space and which may be used to further model an object.

In one embodiment, the rendering unit then sends the vertices of the geometric primitive to a frame buffer controller or other graphics processor. The bits of the clip bits register or registers are also sent to the frame buffer controller and stored in general-purpose registers. The geometric primitive is assembled in the frame buffer controller from the vertices sent by the rendering unit. The frame buffer controller then performs clip testing of the assembled geometric primitive. In one embodiment, the frame buffer controller performs Boolean operations on bits from the clip bits register or clip bits registers to determine whether the geometric primitive should be trivially accepted, trivially rejected, or clipped. In various embodiments, these clip testing operations may be performed in software, in hardware, or in a combination of software and hardware.

A 3-D dot may be trivially rejected if it is outside of any clip plane. In other words, a dot may be trivially rejected if a Boolean AND operation on the single clip bits register and a trivial reject mask yields a nonzero result. The trivial reject mask comprises 1's in the appropriate positions to select the appropriate bits from the clip bits. A 3-D line or vector may be trivially rejected if both of its vertices are outside of at least one particular clip plane. In other words, a line or vector may be trivially rejected if Boolean AND operations on the two clip bits registers and a trivial reject mask yield a nonzero result. A 3-D triangle may be trivially rejected if all three of its vertices are outside of at least one particular clip plane. In other words, a triangle may be trivially rejected if Boolean AND operations on the three clip bits registers and a trivial reject mask yield a nonzero result.

In various embodiments, the determination of trivial acceptance may take place before, after, or substantially simultaneously with the determination of trivial rejection. A 3-D dot may be trivially accepted if it is inside of all three clip planes. In other words, a dot may be trivially accepted if a Boolean AND operation on the inversion of the single clip bits register and a trivial accept mask yields a result of zero. The trivial accept mask comprises 1's in the appropriate positions to select the appropriate bits from the clip bits. A 3-D line or vector may be trivially accepted if it is inside of all three clip planes. In other words, a line or vector may be trivially accepted if a Boolean AND operation on the inversion of the Boolean disjunction of the two clip bits registers and a trivial accept mask yields a result of zero. A 3-D triangle may be trivially accepted if it is inside of all three clip planes. In other words, a triangle may be trivially accepted if a Boolean AND operation on the inversion of the Boolean disjunction of the three clip bits registers and a trivial accept mask yields a result of zero.

The frame buffer controller may include one or more trivial reject masks and one or more trivial accept masks. In one embodiment, a trivial reject mask and a trivial accept mask are used to select the appropriate regular clip bits when guard band clipping is disabled. In one embodiment, when guard plane clipping is enabled, a trivial reject mask and a trivial accept mask are used to select the appropriate guard band clip bits for the X and Y axes and the appropriate regular clip bits for the Z axis. In various embodiments, when model clipping is enabled, a trivial reject mask and a trivial accept mask are used to select the appropriate model clip bits. The same Boolean operations set forth above can be used for different types of clipping, including regular clipping, guard band clipping, and model clipping, by using different trivial reject masks and trivial accept masks.

An advantage of using one clip bits register per vertex rather than one clip bits register per geometric primitive is the possibility of clip testing in parallel. In some embodiments, for example, a plurality of rendering units set the clip bits on multiple vertices simultaneously. In some embodiments, one or more units in the frame buffer controller perform the Boolean clip testing operations on multiple vertices simultaneously. Clip testing in parallel is generally faster than clip testing in serial.

Furthermore, because an operation on multiple sets of bits in multiple different registers can generally be performed faster than the same operation on multiple sets of bits in a single register, the use of one clip bits register per vertex allows for faster clip testing operations. For example, if the clip bits for all the vertices of a triangle are stored in a single register, then additional Boolean AND operations to mask out the appropriate bits may need to be performed for each vertex. In embodiments using one register per vertex, however, these additional mask operations are avoided.

Based on the Boolean operations described above, the frame buffer controller determines whether the geometric primitive should be trivially accepted, trivially rejected, or clipped. If the geometric primitive is wholly within the clipping boundary, then it is trivially accepted. In other words, the primitive is passed further down the rendering pipeline of the graphics system for continued processing and eventual display on a display device. On the other hand, if the geometric primitive is wholly outside the clipping boundary, then it is trivially rejected. In other words, the primitive is discarded, and the graphics system proceeds with the next geometric primitive in the queue.

If the geometric primitive was neither trivially accepted nor trivially rejected, then the primitive may need to be clipped. If so, then the frame buffer controller sends an interrupt to the rendering unit. The frame buffer controller also sets an exception register with a value indicating the need to clip the geometric primitive. Upon receiving the interrupt, the rendering unit checks the status of the exception register to determine the reason for the interrupt. The frame buffer controller stalls. In this way, the frame buffer controller passes control to the rendering unit.

The rendering unit reads the vertices of the geometric primitive from the frame buffer controller. The geometric primitive is then clipped by the rendering unit. Often, clipping involves recalculating the positions of existing vertices and/or creating new vertices so that the geometric primitive is located entirely within the clipping boundary. In other words, the primitive may be broken up into two or more primitives along the clipping boundary. The result of the clipping operation is a new set of vertices. The rendering unit sends the new vertices, representing a clipped form of the geometric primitive, to the frame buffer controller. The frame buffer controller clears the interrupt and resumes its processing of the geometric primitive, preparing it for eventual display on a display device.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
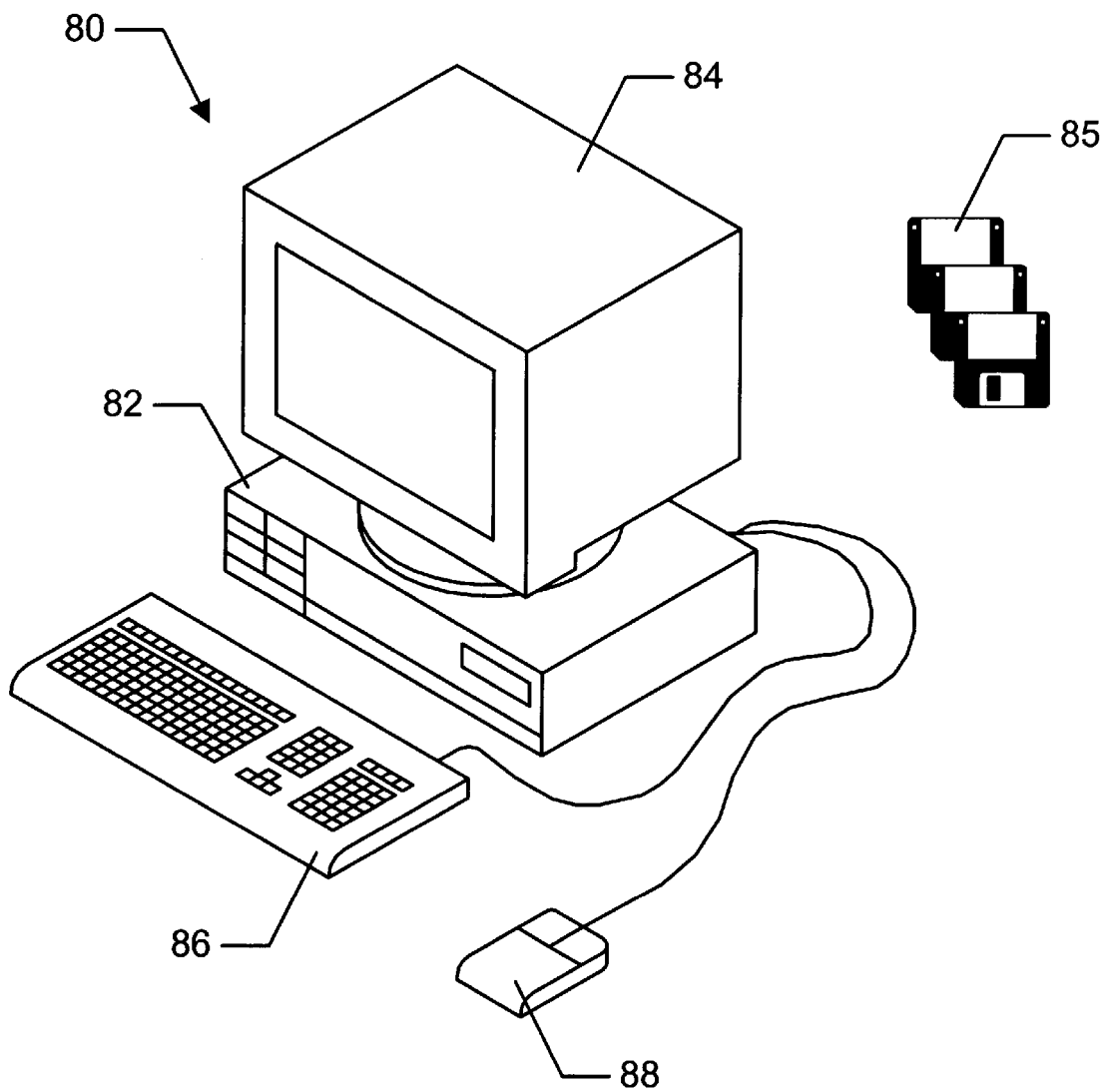
FIG. 1 illustrates one embodiment of a computer system that includes one embodiment of a graphics system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Computer System—FIG. 1

Referring now to FIG. 1, one embodiment of a computer system 80 that includes a three-dimensional (3-D) graphics system is shown. The 3-D graphics system may be comprised in any of various systems, including a computer system, network PC, Internet appliance, a television, including HDTV systems and interactive television systems, personal digital assistants (PDAs), and other devices which display 2-D and or 3-D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, body sensors, etc.). Application software may be executed by the computer system 80 to display 3-D graphical objects on display device 84. As described further below, the 3-D graphics system m computer system 80 includes improved clip testing to improve the speed and efficiency of displaying images on display device 84.

The computer system 80 may be coupled to a memory medium 85. As used herein, the term "memory medium" includes a non-volatile medium, e.g., a magnetic medium, hard disk, or optical storage; a volatile medium, such as computer system memory, e.g., random access memory (RAM) such as DRAM, SDRAM, SRAM, EDO RAM, Rambus RAM, etc.; or an installation medium, such as CD-ROM, floppy disks, or a removable disk, on which computer programs are stored for loading into the computer system. The term "memory medium" may also include other types of memory. The memory medium 85 may store program instructions and/or data which may implement the improved clip system and method testing as described herein. Furthermore, the memory medium 85 may be utilized to install the program instructions and/or data.

Figure 2:
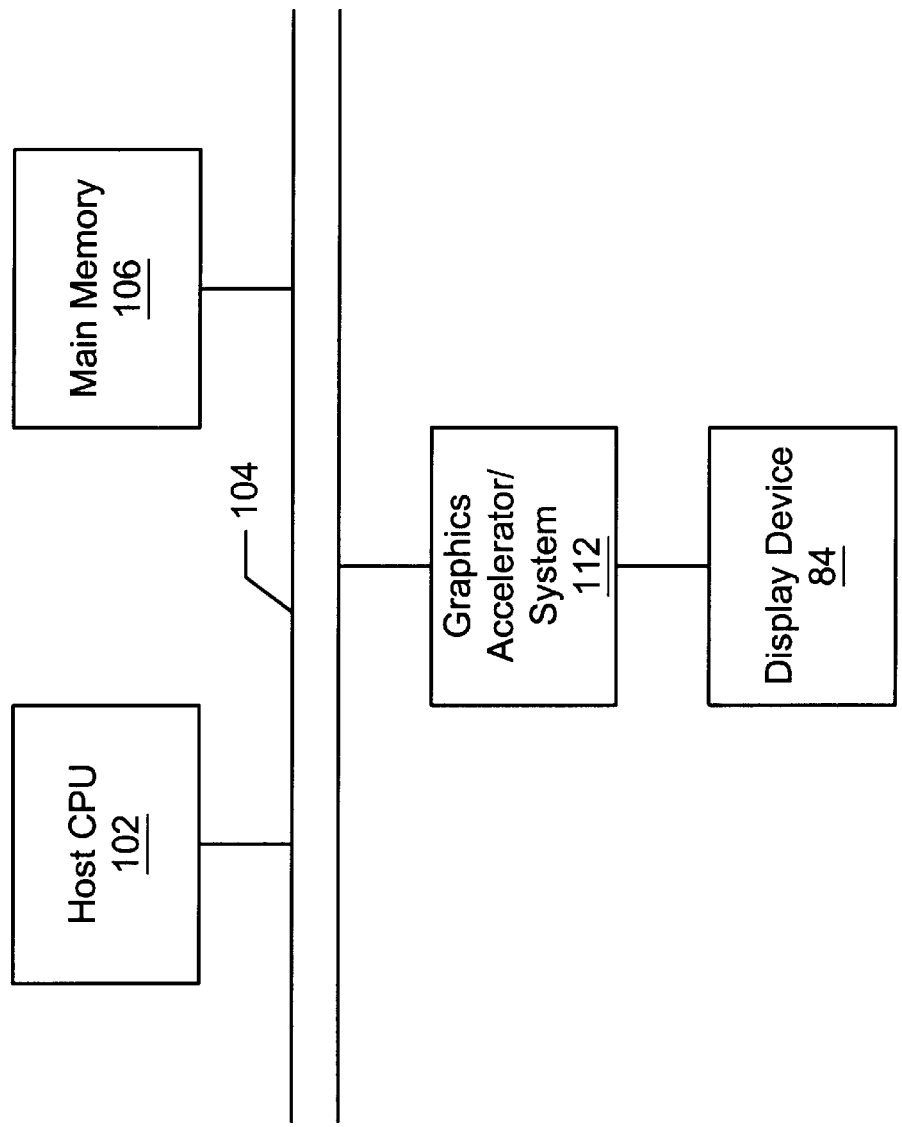
FIG. 2 is a simplified block diagram of the computer system of FIG. 1.

Computer System Block Diagram—FIG. 2

Referring now to FIG. 2, a simplified block diagram illustrating the computer system of FIG. 1 is shown. For the sake of convenience, elements of the computer system that are not necessary for an understanding of the present invention are not shown. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors, and CPUs. The system memory 106 may comprise any combination of different types of memory subsystems, including random access memories (e.g., static random access memories or "SRAMs," synchronous dynamic random access memories or "SDRAMs," and Rambus dynamic random access memories or "RDRAM," among others), and mass storage devices. The system bus or host bus 104 may comprise one or more communication or host computer buses (for communication between host processors, CPUs, and memory subsystems) as well as specialized subsystem buses.

A 3-D graphics system or graphics system 112 according to the present invention is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the 3-D graphics system may be coupled to one or more of the buses in computer system 80 and/or may be coupled to various types of buses. In addition, the 3-D graphics system may be coupled to a communication port and thereby directly receive graphics data from an external source, e.g., the Internet or a network. As shown in the figure, display device 84 is connected to the 3-D graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL or Java 3-D may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer these graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

While graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module.

Figure 3:
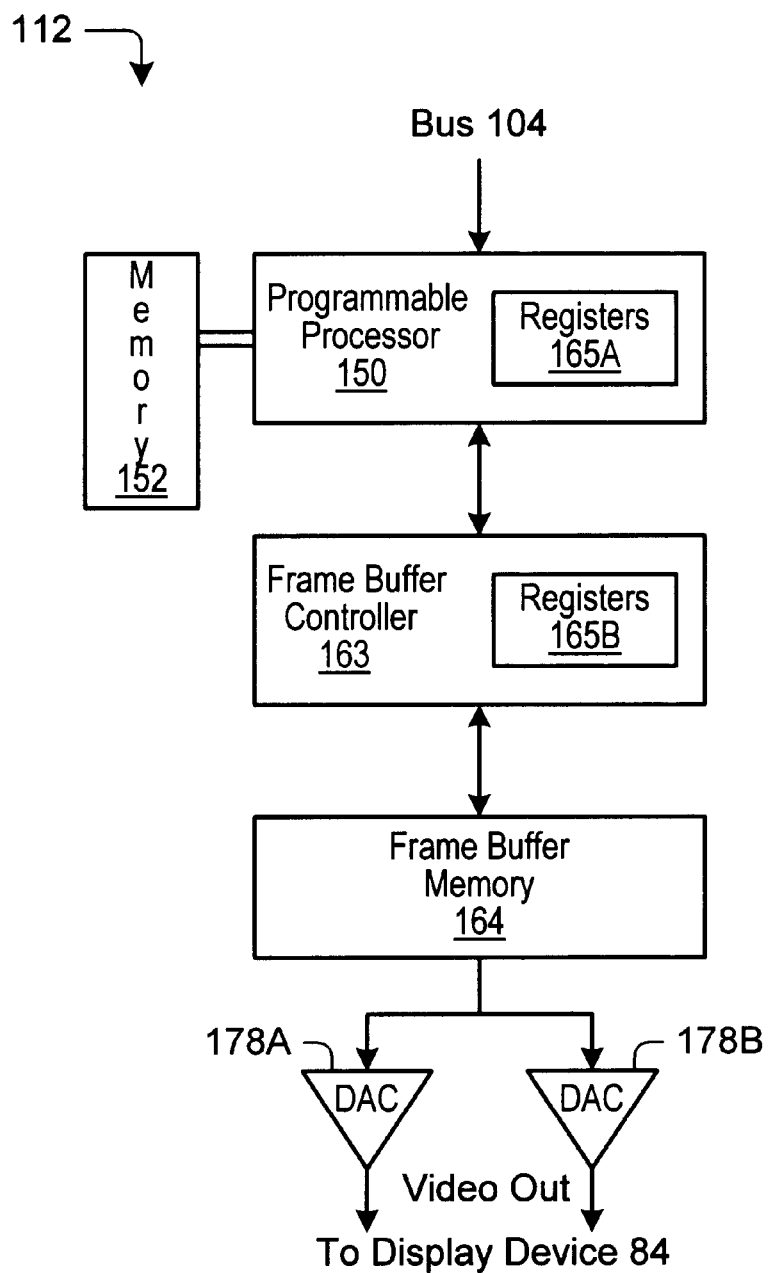
FIG. 3 is a block diagram illustrating more details of one embodiment of the graphics system of FIG. 1.

Graphics System—FIG. 3

Referring now to FIG. 3, a block diagram illustrating details of one embodiment of graphics system 112 is shown. Graphics system 112 may include a plurality of graphics processing units such as programmable processor 150 and frame buffer controller 163. A graphics processing unit may be any suitable type of high performance processor (e.g., specialized graphics processors or calculation units, multimedia processors, DSPs, programmable processors, or general-purpose processors). As shown in the figure, graphics system 112 may further comprise one or more frame buffer memories 164. Frame buffer memory 164 may comprise a super-sampled or a conventional frame buffer memory. Frame buffer memory 164 may comprise a double-buffered frame buffer memory. Graphics system 112 may also comprise one or more digital-to-analog converters (DACs) 178A–B.

In other embodiments, graphics system 112 may include other elements such as other graphics processing units, other memories, control units, and/or scheduling units. Graphics system 112 may include a plurality of processors 150 and/or frame buffer controllers 163 working in parallel. The functionality of processor 150, frame buffer controller 163, and/or frame buffer memory 164 may be comprised on a single chip.

A. Programmable Processor

In one embodiment, programmable processor 150 may comprise a rendering unit. Rendering unit 150, also referred to herein as a draw unit, may be configured to receive graphics instructions and data from host bus 104 and then perform a number of functions, depending upon the exact implementation. For example, rendering unit 150 may be configured to perform decompression (if the data is compressed), transformation, clipping, lighting, texturing, depth cueing, transparency processing, set-up, and screen-space rendering of various graphics primitives occurring within the graphics data. In some embodiments, operations such as set-up and screen-space rendering are deferred until later in the rendering pipeline and are performed by other graphics processing units such as frame buffer controller 163. Each of these features is described separately below.

The graphics data may comprise one or more graphics primitives. As used herein, the term graphics primitive includes polygons, parametric surfaces, splines, NURBS (non-uniform rational B-splines), sub-divisions, surfaces, fractals, volume primitives, and particle systems. These graphics primitives are described in detail in the textbook entitled *Computer Graphics: Principles and Practice* by James D. Foley, et al., published by Addison-Wesley Publishing Co., Inc., 1996. Note that polygons are referred to throughout this detailed description for simplicity, but the embodiments and examples described may also be used with graphics data comprising other types of graphics primitives.

Depending upon the type of compressed graphics data received, rendering unit 150 may be configured to perform arithmetic decoding, run-length decoding, Huffman decoding, and dictionary decoding (e.g., LZ77, LZSS, LZ78, and LZW). In another embodiment, rendering unit 150 may be configured to decode graphics data that has been compressed using geometric compression. Geometric compression of 3-D graphics data may achieve significant reductions in data size while retaining most of the image quality. Two methods for compressing and decompressing 3-D geometry are described in U.S. Pat. No. 5,793,371, application Ser. No. 08/511,294, (filed on Aug. 4, 1995, entitled "Method And Apparatus For Geometric Compression Of Three-Dimensional Graphics Data," and U.S. Pat. application Ser. No. 09/095,777, filed on Jun. 11, 1998, entitled "Compression of Three-Dimensional Geometry Data Representing a Regularly Tiled Surface Portion of a Graphical Object," In embodiments of graphics system 112 that support decompression, the graphics data received by rendering unit 150 is decompressed into one or more graphics "primitives" which may then be rendered. The term primitive refers to components of objects that define its shape (e.g., points, lines, triangles, polygons in two or three dimensions, polyhedra, or free-form surfaces in three dimensions). Rendering unit 150 may be any suitable type of high performance processor (e.g., specialized graphics processors or calculation units, multimedia processors, DSPs, programmable processor, or general purpose processors).

Transformation refers to manipulating an object and includes translating the object (i.e., moving the object to a different location), scaling the object (i.e., stretching or shrinking), and rotating the object (e.g., in three-dimensional space, or "3-space").

Clipping refers to defining the limits of the displayed image (i.e., establishing a clipping region, usually a rectangle) and then not rendering or displaying pixels that fall outside those limits. Clipping and an associated task, clip testing, are described in greater detail below.

Lighting refers to calculating the illumination of the objects within the displayed image to determine what color and or brightness each individual object will have. Depending upon the shading algorithm being used (e.g., constant, Gouraud, or Phong), lighting may be evaluated at a number of different locations. For example, if constant shading is used (i.e., each pixel of a polygon has the same lighting), then the lighting need only be calculated once per polygon. If Gouraud shading is used, then the lighting is calculated once per vertex. Phong shading calculates the lighting on a per-pixel basis.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to calculate the data used to generate each pixel that will be displayed. In an embodiment of graphics system 112 in which the frame buffer memory 164 is a conventional frame buffer memory, each pixel is calculated and then stored in the frame buffer memory 164. The contents of the frame buffer are then output to the display device to create the final image. In another embodiment of graphics system 112, however, rendering unit 150 may calculate "samples" instead of actual pixel data. This allows rendering unit 150 to "super-sample" or calculate more than one sample per pixel. Rendering unit 150 may comprise a number of smaller functional units, e.g., a separate set-up/decompress unit and a lighting unit.

More details on super-sampling are discussed in the following books: *Principles of Digital Image Synthesis* by Andrew Glassner, 1995, Morgan Kaufman Publishing (Volume 1); and *Renderman Companion* by Steve Upstill, 1990, Addison Wesley Publishing.

Rendering unit 150 may include registers 165A for high-speed storage and manipulation of data. Registers 165A may include both general-purpose and specialized registers.

B. Data Memory

Each rendering unit 150 may be coupled to an instruction and data memory 152. In one embodiment, each data memory 152 may be configured to store both data and instructions for a rendering unit 150. While implementations may vary, in one embodiment each data memory 152 may comprise two 8 MByte SDRAMs providing a total of 16 MBytes of storage for each rendering unit 150. In another embodiment, RDRAMs (Rambus DRAMs) may be used to support the decompression and set-up operations of rendering unit 150, while SDRAMs may be used to support the draw functions of rendering unit 150.

C. Frame Buffer Controller

Frame buffer controller 163 may perform graphics processing operations such as set-up and screen-space rendering as discussed above. Frame buffer controller 163 may include registers 165B for high-speed storage and manipulation of data. Registers 165B may include both general-purpose and specialized registers.

D. Frame Buffer Memory

Frame buffer memory 164 typically stores graphics data for eventual display on display device 84. In one embodiment, frame buffer memory 164 is a conventional frame buffer memory which maintains a one-to-one correspondence between pixels in frame buffer memory 164 and pixels on display device 84. Each pixel in frame buffer memory 164 corresponds to one output pixel on display device 84.

In one embodiment, frame buffer memory 164 is a super-sampled frame buffer or sample buffer comprising one or more sample memories which are configured to store a plurality of samples generated by one or more rendering units. As used herein, the term "sample buffer" refers to one or more memories which store samples. One or more samples are filtered to form output pixels (i.e., pixels to be displayed on a display device). The number of samples stored may be greater than, equal to, or less than the total number of pixels output to the display device to refresh a single frame. Each sample may correspond to one or more output pixels. As used herein, a sample "corresponds" to an output pixel when the sample's information contributes to final output value of the pixel. Note, however, that some samples may contribute zero to their corresponding output pixel after filtering takes place.

Stated another way, the sample buffer stores a plurality of samples that have positions that correspond to locations in screen space on the display, i.e., the samples contribute to one or more output pixels on the display. The number of stored samples may be greater than the number of pixel locations, and more than one sample may be combined in the convolution (filtering) process to generate a particular output pixel displayed on the display device. Any given sample may contribute to one or more output pixels.

In embodiments featuring a sample buffer, one or more graphics processing units such as rendering unit 150 and/or frame buffer controller 163 may be configured to generate a plurality of sample positions according to a particular sample positioning scheme (e.g., a regular grid, a perturbed regular grid, etc.). Alternatively, the sample positions (or offsets that are added to regular grid positions to form the sample positions) may be read from a sample position memory (e.g., a RAM/ROM table). Upon receiving a polygon that is to be rendered, a graphics processing unit determines which samples fall within the polygon based upon the sample positions. The graphics processing unit renders the samples that fall within the polygon and stores rendered samples in sample memories. As used herein, the terms "render" and "draw" are used interchangeably and refer to calculating color values for samples. Depth values, alpha values, and other per-sample values may also be calculated in the rendering or drawing process.

In embodiments with a plurality of frame buffer controllers 163, one or more schedule units may be coupled between the frame buffer controllers 163 and the frame buffer memory 164. A schedule unit is configured to sequence the completed pixels or samples and store them in the frame buffer memory 164. In larger configurations, multiple schedule units may be used in parallel.

E. DACs

DACs 178A–B may operate as the final output stage of graphics system 112. The DACs 178A–B serve to translate the digital pixel data received from frame buffer memory 164 into analog video signals that are then sent to the display device. In one embodiment, DACs 178A–B may be bypassed or omitted completely in order to output digital pixel data in lieu of analog video signals. This may be useful when display device 84 is based on a digital technology (e.g., an LCD-type display or a digital micro-mirror display).

Figure 4:
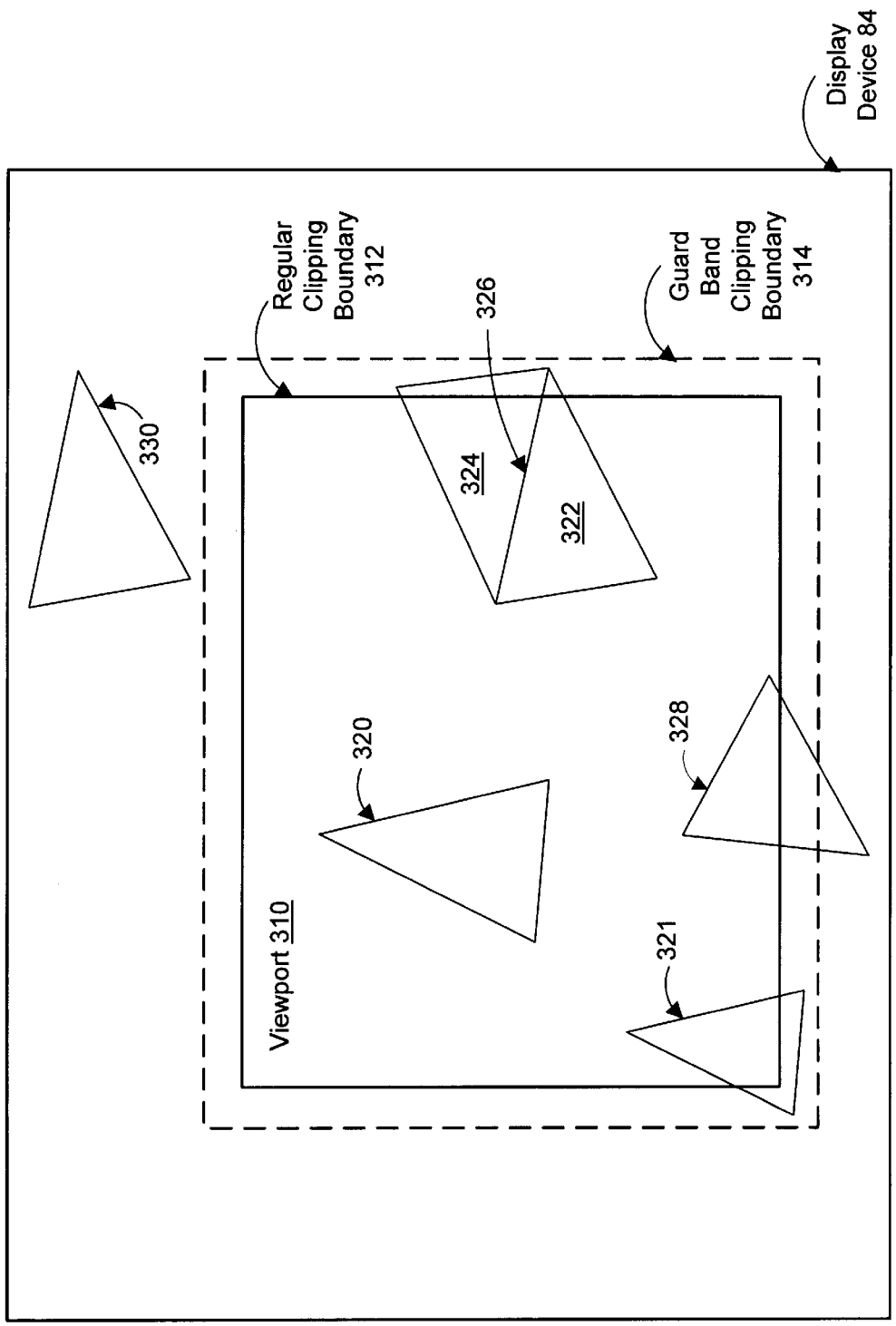
FIG. 4 illustrates examples of regular clipping and guard band clipping according to one embodiment.

Clipping—FIG. 4

FIG. 4 further illustrates clipping according to one embodiment. A display screen of a display device 84 includes a viewport 310 which is defined by a regular clipping boundary 312. The viewport 310 may comprise a window or another subset of the display screen, or even the entire display screen. Although the viewport 310 is shown as having two dimensions in FIG. 4 for ease and convenience of illustration, in one embodiment the viewport has three dimensions in order to properly clip three-dimensional geometric primitives. Therefore, six clipping planes may define the clipping boundary 312: a positive x plane, a minus x plane, a positive y plane, a minus y plane, a positive z plane, and a minus z plane.

Triangles 320, 321, 322, 324, 328, and 330 represent geometric primitives which are inputs to a 3-D graphics accelerator 112 configured to render objects on the display device 84. Triangles 322 and 324 share a common edge 326. In a typical clipping operation, triangle 320, which lies wholly within viewport 310, is not clipped. On the other hand, triangle 330, which is completely outside regular clipping boundary 312, is completely clipped, and therefore rejected from further processing. Triangles 321, 322, 324, and 328, however, are only partially outside viewport 310.

When these primitives are rendered on the display device 84 in the final stages of the graphics pipeline, only the portion within viewport 310 is displayed, and the portion outside the viewport 310 is typically discarded.

Clipping is a time-consuming operation. A large number of calculations are required to clip the various properties of a primitive, including coordinate and color data, to the edge of a viewing region such as the regular clipping boundary 312. To increase performance, it is therefore desirable to reduce the number of primitives for which clipping is performed. For this reason, the concept of guard band clipping was developed. In guard band clipping, a second clipping boundary 314, encompassing the regular clipping boundary 312, is defined for the viewport 310. Primitives which lie partially outside the regular clipping boundary but inside the guard band clipping boundary are not clipped. The pixels within these primitive that are outside the viewport but inside the guard band clipping boundary are instead rejected in a later stage of the graphics pipeline. This deferred rejection is typically performed faster than the standard clipping operation because only a small number of pixels between the guard band and the regular clipping boundary are rendered and eventually discarded. Thus, performance of the graphics system is advantageously increased by performing guard band clipping.

In FIG. 4, the guard band clipping region is defined by a guard band clipping boundary 314. The guard band clipping boundary may be defined by four planes: a guard band positive x plane, a guard band minus x plane, a guard band positive y plane, and a guard band minus y plane. In one embodiment, the four guard band clipping planes form a truncated pyramid. When guard band clipping is implemented, triangles 321, 322, and 324 are not clipped because they lie entirely within the guard band clipping boundary 314 even though they lie outside of the regular clipping boundary 312. Triangle 328 is partially clipped (to the regular clipping boundary 312) since a portion of the primitive lies outside the guard band clipping boundary 314.

If the guard band clipping boundary is defined to be too much larger than the regular clipping boundary, however, then the deferred rejection of pixels in the guard band region may become more time-consuming than the normal clipping procedure.

Additionally, problematic numeric overflows may occur in vertex processing operations subsequent to the clip test for primitive vertices in a large guard band region. The guard band region is therefore generally designed to be only a small percentage larger than the viewport.

Figure 5:
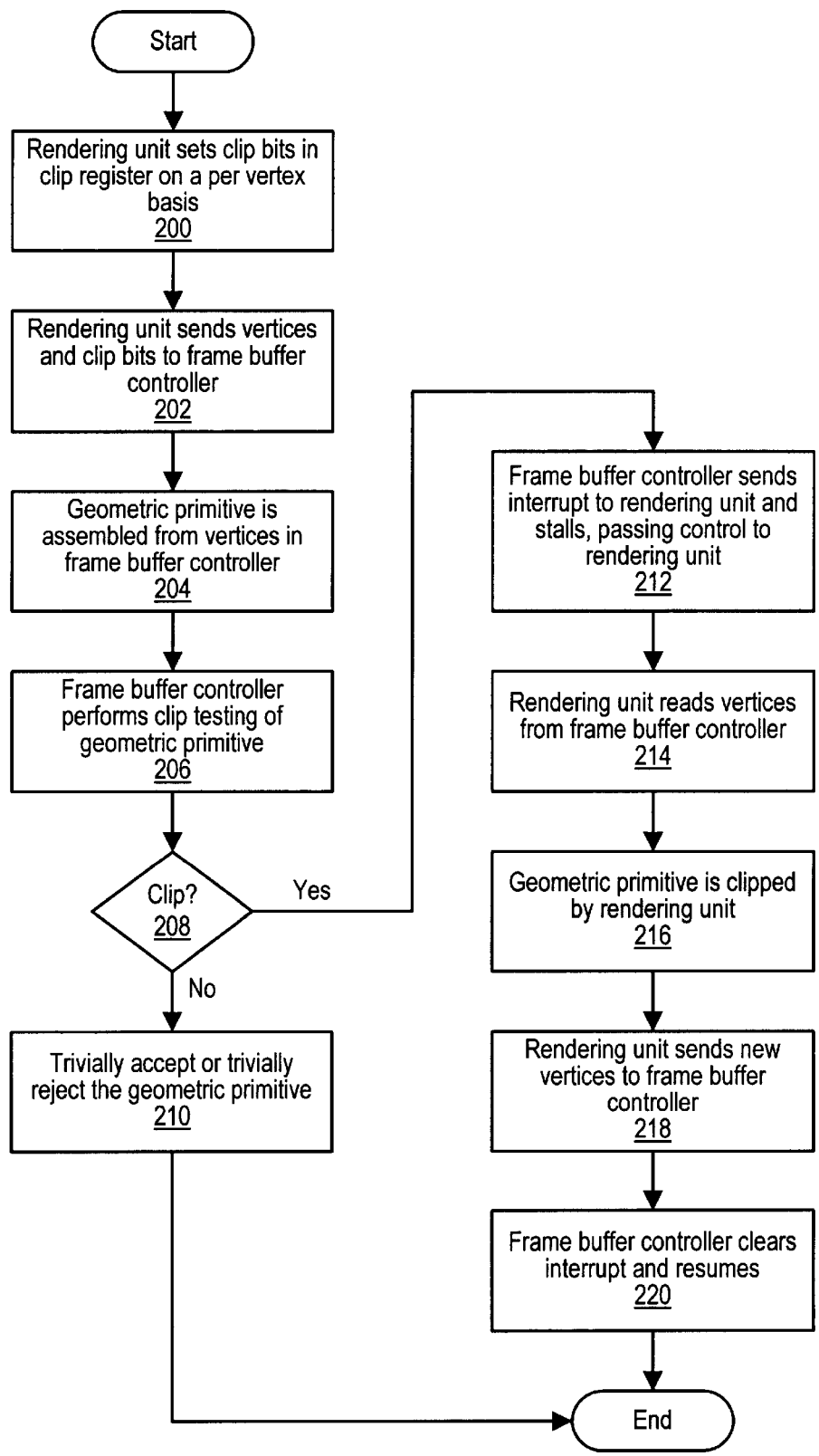
FIG. 5 is a flowchart showing an improved method of clip testing according to one embodiment.
Figure 6:
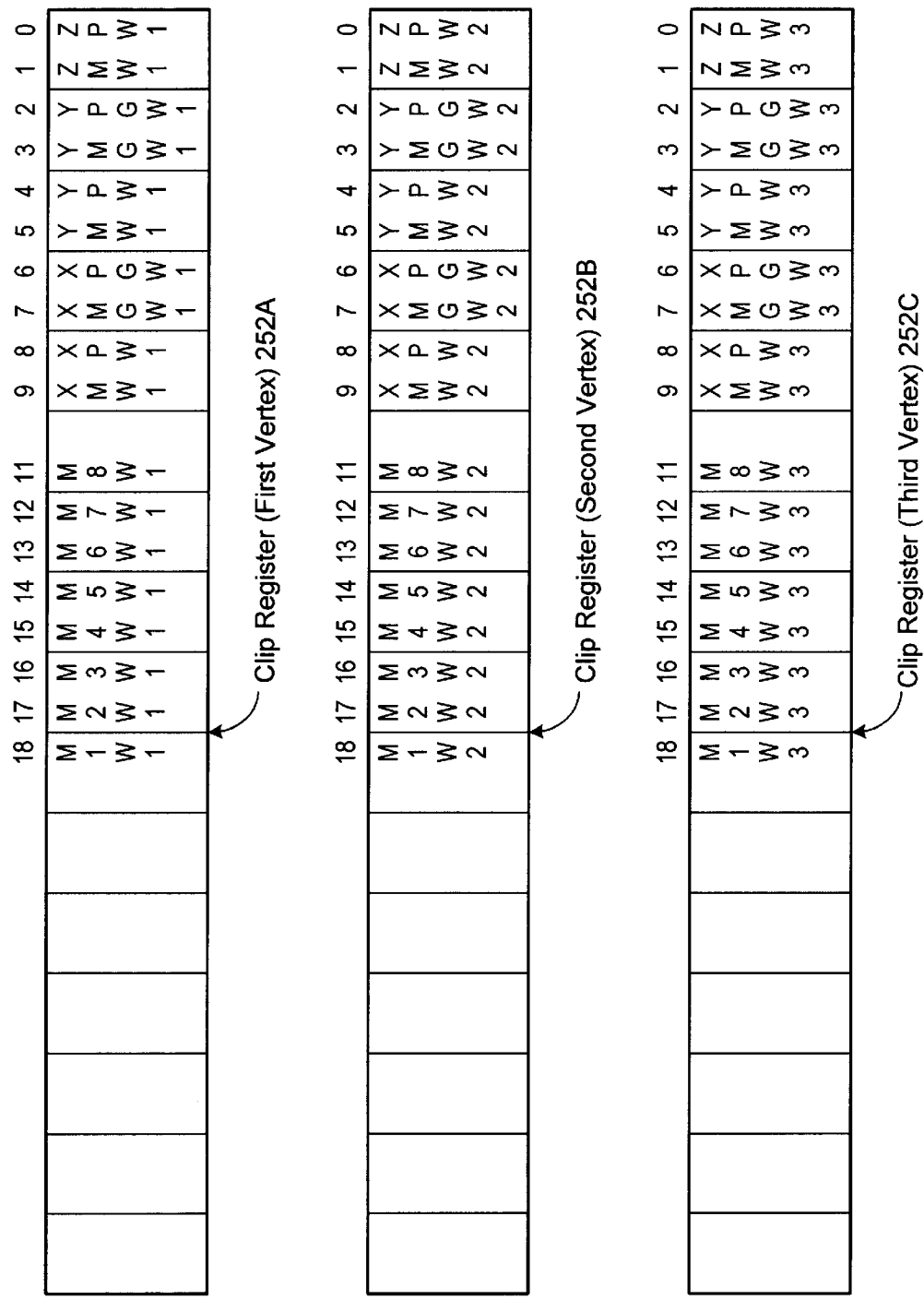
FIG. 6 illustrates clip registers for three vertices of a single geometric primitive according to one embodiment.

Clip Testing—FIGS. 5–6

As used herein, "clip testing" refers to the operation of determining whether a geometric primitive is to be clipped or not clipped. Two possible outcomes of clip testing are trivial rejection and trivial acceptance. A third possible outcome is the determination that clipping may be required. As used herein, "trivial rejection" or "rejection" refers to the determination that a geometric primitive lies wholly outside the viewport and is therefore to be discarded. As used herein, "trivial acceptance" or "acceptance" refers to the determination that a geometric primitive lies wholly inside the viewport and is therefore to be kept for further processing and not clipped.

In some embodiments, improved clip testing utilizes two types of graphics processing units. In one embodiment, one graphics processing unit is a rendering unit or other processor and the other graphics processing unit is a frame buffer controller or other graphics processor. As noted previously, the frame buffer controller 163 may be coupled to a conventional frame buffer or a super-sampled frame buffer (i.e., a sample buffer).

However, other types of graphics processing units may also be used. In various embodiments, furthermore, improved clip testing as described herein may utilize more than two graphics processing units. For example, improved clip testing according to another embodiments may utilize a plurality of rendering units 150 and/or a plurality of frame buffer controllers 163.

In other embodiments, improved clip testing as described herein may be performed by a single graphics processing unit.

An improved method of clip testing according to one embodiment is illustrated with a flowchart in FIG. 5. In step 200, a rendering unit 150 tests the vertices of a geometric primitive against the various planes of the clipping boundary and sets the bits in a clip bits register accordingly. The rendering unit sets the bits in the clip bits register on a per-vertex basis: that is, without analyzing the relationship of the geometric primitive as a whole to the clipping boundary.

In one embodiment, the clip bits register (also referred to as a clip register) is a general-purpose, 32-bit status register which may contain clip bits information for a vertex of a geometric primitive. Geometric primitives may include dots or points having one vertex, lines or vectors having two vertices, and triangles having three vertices. In one embodiment, each vertex of a geometric primitive has its own 32-bit clip bits register. FIG. 6 illustrates three clip bits registers 252A–C, one for each of the three vertices of a triangle. The clip bits register may comprise ten bits: six for the six regular clipping planes and four for the four guard band clipping planes. Each bit in the registers is set to "1" if the vertex is outside the clipping boundary with respect to a particular clipping plane or "0" if the vertex is inside the clipping boundary with respect to the particular clipping plane. For example, the bit "XPW1" h as a value of 1 only if the X coordinate of vertex 1 is to the right of the right-hand X-axis clipping plane. The "X" stands for the X axis, the "P" stands for "plus," and the "1" refers to the first vertex of the triangle. In a similar way, the bit "XMW1" has a value of 1 only if the X coordinate of vertex 1 is to the left of the left-hand X-axis clipping plane. Again, the "X" stands for the X axis, the "M" stands for "minus," and the "1" refers to the first vertex of the triangle. In the remaining bits, the letter "G" refers to guard planes; these bits are used if guard band clipping has been enabled. The "Y" and "Z" refer to clipping planes for the Y and Z axes, respectively. The "2" and "3" refer to the second and third vertices of the triangle, respectively. In one embodiment, the unused bits are set to zero.

For a 3-D dot or point, only one clip bits register 252A is used. For a line or vector, two clip bits registers 252A–B are used.

Various embodiments may include additional rules to handle boundary situations. In other words, if a vertex coincides with a clipping plane, then the clip testing may include additional "tie-breaking" logic to determine whether the vertex is inside or outside the clipping boundary.

In various embodiments, each vertex may have up to eight additional bits (M1Wx through M8Wx) to indicate whether the vertex is inside or outside of model clipping planes. Model clipping planes are additional clipping planes which may be located arbitrarily in space. Model clipping planes may be used to further model an object. For example, model clipping planes may be used to show various slices or segments of an MRI (Magnetic Resonance Imaging) image. In one embodiment, the in/out bits for model clipping planes are separated from the other ten bits by a single bit, as shown in registers 252A–C in FIG. 6.

Referring back to FIG. 5, in step 202 the rendering unit sends the vertices of the geometric primitive to the frame buffer controller of the frame buffer. The bits of the clip bits register or registers are also sent to the frame buffer controller 163 and stored in registers 165. In step 204, the geometric primitive is assembled in the frame buffer controller from the vertices sent by the rendering unit.

In step 206, the frame buffer controller performs clip testing of the assembled geometric primitive. In one embodiment, the frame buffer controller performs Boolean operations on bits from the clip bits register or clip bits registers to determine whether the geometric primitive should be trivially accepted, trivially rejected, or clipped. In one embodiment, these Boolean algorithms are performed in software. However, these algorithms can also be performed in hardware or in a combination of hardware and software. The clip testing algorithms are described in further detail below.

In one embodiment, the frame buffer controller includes 32-bit mask registers which can be used to select the significant bits from all the bits in a clip bits register. In various embodiments, the masks have ones in places where the clip bits are significant, and zeroes elsewhere, in order to select the appropriate clip bits when the mask is Boolean ANDed with a clip bits register or combination of clip bits registers.

Trivial Rejection

In the trivial rejection and trivial acceptance operations set forth below, "AND" and "OR" are Boolean operators, "!" is an inversion operator, "=" indicates equal-to, and "!=" indicates not-equal-to.

A 3-D dot may be trivially rejected if it is outside of any clip plane. This determination of trivial rejection may be performed by the following pseudo-code operation, wherein clip_bits_register_1 is the clip register 252A for the first vertex as shown in FIG. 7, and wherein the trivial_reject_mask comprises 1's in the appropriate positions to select the appropriate bits from the clip bits register:

if ((clip_bits_register_1 AND trivial_reject_mask) !=0) then reject

A 3-D line or vector may be trivially rejected if both of its vertices are outside of at least one particular clip plane. This determination of trivial rejection may be performed by the following pseudo-code operation, wherein clip_bits_register_1 is the clip register 252A for the first vertex as shown in FIG. 7, wherein clip_bits_register_2 is the clip register 252B for the second vertex, and wherein the trivial_reject_mask comprises 1's in the appropriate positions to select the appropriate bits from the clip bits:

if ((clip_bits_register_1 AND clip_bits_register_2 AND trivial_reject_mask) !=0) then reject A 3-D triangle may be trivially rejected if all three of its vertices are outside of at least one particular clip plane. This determination of trivial rejection may be performed by the following pseudo-code operation, wherein clip_bits_register_1 is the clip register 252A for the first vertex as shown in FIG. 7, wherein clip_bits_register_2 is the clip register 252B for the second vertex, wherein clip_bits_register_3 is the clip register 252C for the third vertex, and wherein the trivial_reject_mask comprises 1's in the appropriate positions to select the appropriate bits from the clip bits:

if ((clip_bits_register_1 AND clip_bits_register_2 AND clip_bits_register_3 AND trivial_reject_mask) !=0) then reject Trivial Acceptance In various embodiments, the determination of trivial acceptance may take place before, after, or substantially simultaneously with the determination of trivial rejection.

A 3-D dot may be trivially accepted if it is inside of all three clip planes. This determination of trivial acceptance may be performed by the following pseudo-code operation, wherein clip_bits_register_1 is the clip register 252A for the first vertex as shown in FIG. 7, and wherein the trivial_accept_mask comprises 1's in the appropriate positions to select the appropriate bits from the clip bits:

if ((!(clip_bits_register_1) AND trivial_accept_mask) ==0) then accept

A 3-D line or vector may be trivially accepted if it is inside of all three clip planes. This determination of trivial acceptance may be performed by the following pseudo-code operation, wherein clip_bits_register_1 is the clip register 252A for the first vertex as shown in FIG. 7, wherein clip_bits_register_2 is the clip register 252B for the second vertex, and wherein the trivial_accept_mask comprises 1's in the appropriate positions to select the appropriate bits from the clip bits:

if ((!(clip_bits_register_1 OR clip_bits_register_2 AND trivial_accept_mask) ==0) then accept A 3-D triangle may be trivially accepted if it is inside of all three clip planes. This determination of trivial acceptance may be performed by the following pseudo-code operation, wherein clip_bits_register_1 is the clip register 252A for the first vertex as shown in FIG. 7, wherein clip_bits_register_2 is the clip register 252B for the second vertex, wherein clip_bits_register_3 is the clip register 252C for the third vertex, and wherein the trivial_accept_mask comprises 1's in the appropriate positions to select the appropriate bits from the clip bits:

if ((!(clip_bits_register_1 OR clip_bits_register_2 OR clip_bits_register_3 AND trivial_accept_mask) ==0) then accept The frame buffer controller may include one or more trivial reject masks and one or more trivial accept masks. The trivial reject masks and trivial accept masks may be stored in registers 165 in the frame buffer controller 163 as shown in FIG. 3. In one embodiment, a trivial reject mask and a trivial accept mask are used to select the appropriate regular clip bits when guard band clipping is disabled. In one embodiment, when guard plane clipping is enabled, a trivial reject mask and a trivial accept mask are used to select the appropriate guard band clip bits for four clipping planes and the appropriate regular clip bits for another two clipping planes. In various embodiments, when model clipping is enabled, a trivial reject mask and a trivial accept mask are used to select the appropriate model clip bits. The same Boolean operations set forth above can be used for different types of clipping, including regular clipping, guard band clipping, and model clipping, by using different trivial reject masks and trivial accept masks. This flexibility may advantageously increase the simplicity and speed of the system and method of improved clip testing described herein.

An advantage of using one clip bits register per vertex rather than one clip bits register per geometric primitive is the possibility of clip testing in parallel. In some embodiments, for example, a plurality of rendering units set the clip bits on multiple vertices simultaneously. In some embodiments, one or more units in the frame buffer controller perform the Boolean clip testing operations on multiple vertices simultaneously. Clip testing in parallel is generally faster than clip testing in serial.

Furthermore, because an operation on multiple sets of bits in multiple different registers can generally be performed faster than the same operation on multiple sets of bits in a single register, the use of one clip bits register per vertex allows for faster clip testing operations. For example, if the clip bits for all the vertices of a triangle are stored in a single register, then additional Boolean AND operations to mask out the appropriate bits may need to be performed for each vertex. In embodiments using one register per vertex, however, these additional mask operations are avoided.

In step 208 of the flowchart shown in FIG. 5, the frame buffer controller determines whether the geometric primitive should be trivially accepted, trivially rejected, or clipped, based on the Boolean operations described with reference to step 206. If the geometric primitive is wholly within the clipping boundary, as indicated by the result of step 206, then it is trivially accepted in step 210. In other words, the primitive is passed further down the rendering pipeline of the graphics system 112 for continued processing, such as display on a display device. On the other hand, if the geometric primitive is wholly outside the clipping boundary, as indicated by the result of step 206, then it is trivially rejected in step 210. In other words, the primitive is discarded, and the graphics system 112 proceeds with the next geometric primitive in the queue.

If the geometric primitive was neither trivially accepted nor trivially rejected, however, then the primitive may need to be clipped. Note that only a line or polygon may be clipped; generally, a dot must be either trivially accepted or trivially rejected. In step 212, the frame buffer controller sends an interrupt to the rendering unit. The frame buffer controller also sets an exception register with a value indicating the need to clip the geometric primitive. The exception register may be one of the registers 165 and/or memories 152A–150D shown in FIG. 3. Upon receiving the interrupt, the rendering unit checks the status of the exception register to determine the reason for the interrupt. The frame buffer controller stalls. In this way, the frame buffer controller passes control to the rendering unit.

In step 214, the rendering unit reads the vertices of the geometric primitive from the frame buffer controller. In step 216, the geometric primitive is clipped by the rendering unit. Often, clipping involves recalculating the positions of existing vertices and/or creating new vertices so that the geometric primitive is located entirely within the clipping boundary. Clipping may entail creating a plurality of primitives to replace a single original primitive. Various methods of clipping are described in detail in the text book entitled *Computer Graphics: Principles and Practice* by James D. Foley, et al., publish ed by Addison-Wesley Publishing Co., Inc., 1996. The result of the clipping operation is a new set of vertices.

In step 218, the rendering u nit sends the new vertices, representing a clipped form of the geometric primitive, to the frame buffer controller. In step 220, the frame buffer controller clears the interrupt and resumes its processing of the geometric primitive, preparing it for eventual display on a display device.

Various embodiments further include receiving or storing instructions and/or data implemented in accordance with the foregoing description upon a carrier medium. Suitable carrier mediums include storage mediums or memory mediums such as magnetic or optical media, e.g., disk or CD-ROM, as well as signals such as electrical, electromagnetic, or digital signals, conveyed via a communication medium such as a network and/or a wireless link.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. The headings used herein are for organizational purposes only and are not meant to limit the description provided herein or the claims attached hereto.

What is claimed is:

1. A method for preparing graphical data for display with a computer graphics system, the method comprising:

testing vertices of a geometric primitive against a clipping boundary, wherein the geometric primitive has one or more vertices;

setting bits in one or more clip registers according to said testing the vertices of the geometric primitive against the clipping boundary, wherein the one or more clip registers comprise one clip register for each of the one or more vertices of the geometric primitive;

clip testing the geometric primitive using the bits in the one or more clip registers;

trivially accepting the geometric primitive for displaying if said clip testing concludes that the geometric primitive is entirely inside the clipping boundary;

trivially rejecting the geometric primitive for displaying if said clip testing concludes that the geometric primitive is entirely outside the clipping boundary;

sending an interrupt if said clip testing concludes that the geometric primitive is not entirely inside and not entirely outside the clipping boundary; and clipping the geometric primitive if said clip testing concludes that the geometric primitive is not entirely inside and not entirely outside the clipping boundary.

2. The method of claim 1, wherein said clipping the geometric primitive further comprises clipping the geometric primitive after reading an exception register to determine a reason for the interrupt.

3. The method of claim 1, wherein the clip registers comprise general-purpose registers.

4. The method of claim 1, wherein the bits in the one or more clip registers comprise 6 bits for 6 regular clipping planes for each of the one or more vertices in the geometric primitive.

5. The method of claim 4, wherein the bits in the one or more clip registers further comprise 4 bits for 4 guard band clipping planes for each of the one or more vertices in the geometric primitive.

6. The method of claim 4, wherein the bits in the one or more clip registers further comprise bits for model clipping planes for each of the one or more vertices in the geometric primitive.

7. The method of claim 1, wherein said testing the vertices of the geometric primitive against a clipping boundary further comprises:

determining whether each vertex is inside the clipping boundary with respect to each of a plurality of clipping planes;

wherein said setting bits in one or more clip registers according to said testing the vertices of the geometric primitive against the clipping boundary further comprises:

for each vertex and each clipping plane, setting a corresponding bit to a value of zero if the vertex is inside the clipping boundary with respect to the clipping plane;

for each vertex and each clipping plane, setting the corresponding bit to a value of one if the vertex is outside the clipping boundary with respect to the clipping plane;

wherein each bit corresponds to one vertex and one clipping plane.

8. The method of claim 1, wherein said clip testing the geometric primitive using the bits in the one or more clip registers further comprises:

performing Boolean operations on the bits in the one or more clip registers to determine whether the geometric primitive is entirely inside the clipping boundary;

performing Boolean operations on the bits in the one or more clip registers to determine whether the geometric primitive is entirely outside the clipping boundary.

9. The method of claim 8, wherein said performing Boolean operations on the bits in the one or more clip registers to determine whether the geometric primitive is entirely inside a clipping boundary further comprises:

for a geometric primitive with one vertex, performing a Boolean AND operation on a Boolean inversion of the clip register and a trivial accept mask;

for a geometric primitive with two or three vertices, performing a Boolean AND operation on a Boolean inversion of a Boolean disjunction of the clip registers and the trivial accept mask.

10. The method of claim 8, wherein said performing Boolean operations on the bits in the one or more clip registers to determine whether the geometric primitive is entirely outside a clipping boundary further comprises:

performing Boolean AND operations on the one or more clip registers and a trivial reject mask.

11. The method of claim 1, wherein the clipping boundary comprises a regular clipping boundary.

12. The method of claim 1, wherein the clipping boundary includes a guard band clipping boundary.

13. The method of claim 1, further comprising:

displaying the geometric primitive on a display device if said clip testing concludes that the geometric primitive is entirely inside the clipping boundary;

displaying a clipped form of the geometric primitive on the display device if said clip testing concludes that the geometric primitive is not entirely inside and not entirely outside the clipping boundary.

14. The method of claim 1, wherein the geometric primitive and the one or more vertices of the geometric primitive are located in a three-dimensional space.

15. The method of claim 1, wherein said testing vertices of the geometric primitive against the clipping boundary and said setting bits in one or more clip registers are performed by a first processing unit;

wherein said clip testing the geometric primitive using the bits in the one or more clip registers is performed by a second processing unit.

16. The method of claim 15, further comprising:

the second processing unit trivially accepting the geometric primitive for displaying if said clip testing concludes that the geometric primitive is entirely inside the clipping boundary;

the second processing unit trivially rejecting the geometric primitive for displaying if said clip testing concludes that the geometric primitive is entirely outside the clipping boundary;

clipping the geometric primitive if said clip testing concludes that the geometric primitive is not entirely inside and not entirely outside the clipping boundary.

17. The method of claim 16, further comprising:

the second processing unit sending an interrupt to the first processing unit if said clip testing concludes that the geometric primitive is not entirely inside and not entirely outside the clipping boundary.

18. The method of claim 17, wherein said clipping the geometric primitive further comprises the first processing unit clipping the geometric primitive after reading an exception register to determine a reason for the interrupt.

19. A method for preparing graphical data for display with a computer graphics system, the method comprising:

testing vertices of a geometric primitive against a clipping boundary, wherein the geometric primitive has one or more vertices;

setting bits in one or more clip registers according to said testing the vertices of the geometric primitive against the clipping boundary, wherein the one or more clip registers comprise one clip register for each of the one or more vertices of the geometric primitive;

clip testing the geometric primitive using the bits in the one or more clip registers;

wherein the bits in the one or more clip registers comprise 6 bits for 6 regular clipping planes for each of the one or more vertices in the geometric primitive;

wherein the bits in the one or more clip registers further comprise 4 bits for 4 guard band clipping planes for each of the one or more vertices in the geometric primitive.

20. The method of claim 19, wherein the bits in the one or more clip registers further comprise bits for model clipping planes for each of the one or more vertices in the geometric primitive.

21. The method of claim 19, wherein said clip testing the geometric primitive using the bits in the one or more clip registers further comprises:

performing Boolean operations on the bits in the one or more clip registers to determine whether the geometric primitive is entirely inside the clipping boundary;

performing Boolean operations on the bits in the one or more clip registers to determine whether the geometric primitive is entirely outside the clipping boundary.

22. The method of claim 21, wherein said performing Boolean operations on the bits in the one or more clip registers to determine whether the geometric primitive is entirely inside a clipping boundary further comprises:

for a geometric primitive with one vertex, performing a Boolean AND operation on a Boolean inversion of the clip register and a trivial accept mask;

for a geometric primitive with two or three vertices, performing a Boolean AND operation on a Boolean inversion of a Boolean disjunction of the clip registers and the trivial accept mask.

23. The method of claim 21,
wherein said performing Boolean operations on the bits in the one or more clip registers to determine whether the geometric primitive is entirely outside a clipping boundary further comprises:
performing Boolean AND operations on the one or more clip registers and a trivial reject mask.

24. The method of claim 19,
wherein said testing vertices of the geometric primitive against the clipping boundary and said setting bits in one or more clip registers are performed by a first processing unit;
wherein said clip testing the geometric primitive using the bits in the one or more clip registers is performed by a second processing unit.

25. The method of claim 24, further comprising:
the second processing unit trivially accepting the geometric primitive for displaying if said clip testing concludes that the geometric primitive is entirely inside the clipping boundary;
the second processing unit trivially rejecting the geometric primitive for displaying if said clip testing concludes that the geometric primitive is entirely outside the clipping boundary;
clipping the geometric primitive if said clip testing concludes that the geometric primitive is not entirely inside and not entirely outside the clipping boundary.

26. The method of claim 25, further comprising:
the second processing unit sending an interrupt to the first processing unit if said clip testing concludes that the geometric primitive is not entirely inside and not entirely outside the clipping boundary.

27. The method of claim 26,
wherein said clipping the geometric primitive further comprises the first processing unit clipping the geometric primitive after reading an exception register to determine a reason for the interrupt.

28. A method for preparing graphical data for display with a computer graphics system, the method comprising:
testing vertices of a geometric primitive against a clipping boundary, wherein the geometric primitive has one or more vertices;
setting bits in one or more clip registers according to said testing the vertices of the geometric primitive against the clipping boundary, wherein the one or more clip registers comprise one clip register for each of the one or more vertices of the geometric primitive;
clip testing the geometric primitive using the bits in the one or more clip registers;
wherein the bits in the one or more clip registers comprise 6 bits for 6 regular clipping planes for each of the one or more vertices in the geometric primitive;
wherein the bits in the one or more clip registers further comprise bits for model clipping planes for each of the one or more vertices in the geometric primitive.

29. The method of claim 28,
wherein said clip testing the geometric primitive using the bits in the one or more clip registers further comprises:
performing Boolean operations on the bits in the one or more clip registers to determine whether the geometric primitive is entirely inside the clipping boundary;
performing Boolean operations on the bits in the one or more clip registers to determine whether the geometric primitive is entirely outside the clipping boundary.

30. The method of claim 29,
wherein said performing Boolean operations on the bits in the one or more clip registers to determine whether the geometric primitive is entirely inside a clipping boundary further comprises:
for a geometric primitive with one vertex, performing a Boolean AND operation on a Boolean inversion of the clip register and a trivial accept mask;
for a geometric primitive with two or three vertices, performing a Boolean AND operation on a Boolean inversion of a Boolean disjunction of the clip registers and the trivial accept mask.

31. The method of claim 29,
wherein said performing Boolean operations on the bits in the one or more clip registers to determine whether the geometric primitive is entirely outside a clipping boundary further comprises:
performing Boolean AND operations on the one or more clip registers and a trivial reject mask.

32. The method of claim 28,
wherein said testing vertices of the geometric primitive against the clipping boundary and said setting bits in one or more clip registers are performed by a first processing unit;
wherein said clip testing the geometric primitive using the bits in the one or more clip registers is performed by a second processing unit.

33. The method of claim 32, further comprising:
the second processing unit trivially accepting the geometric primitive for displaying if said clip testing concludes that the geometric primitive is entirely inside the clipping boundary;
the second processing unit trivially rejecting the geometric primitive for displaying if said clip testing concludes that the geometric primitive is entirely outside the clipping boundary;
clipping the geometric primitive if said clip testing concludes that the geometric primitive is not entirely inside and not entirely outside the clipping boundary.

34. The method of claim 33, further comprising:
the second processing unit sending an interrupt to the first processing unit if said clip testing concludes that the geometric primitive is not entirely inside and not entirely outside the clipping boundary.

35. The method of claim 34,
wherein said clipping the geometric primitive further comprises the first processing unit clipping the geometric primitive after reading an exception register to determine a reason for the interrupt.

36. A method for preparing graphical data for display with a computer graphics system, the method comprising:
testing vertices of a geometric primitive against a clipping boundary, wherein the geometric primitive has one or more vertices;
setting bits in one or more clip registers according to said testing the vertices of the geometric primitive against the clipping boundary, wherein the one or more clip registers comprise one clip register for each of the one or more vertices of the geometric primitive;
clip testing the geometric primitive using the bits in the one or more clip registers;
wherein said clip testing the geometric primitive using the bits in the one or more clip registers further comprises:
performing Boolean operations on the bits in the one or more clip registers to determine whether the geometric primitive is entirely inside the clipping boundary;

performing Boolean operations on the bits in the one or more clip registers to determine whether the geometric primitive is entirely outside the clipping boundary;

wherein said performing Boolean operations on the bits in the one or more clip registers to determine whether the geometric primitive is entirely inside a clipping boundary further comprises:

for a geometric primitive with one vertex, performing a Boolean AND operation on a Boolean inversion of the clip register and a trivial accept mask;

for a geometric primitive with two or three vertices, performing a Boolean AND operation on a Boolean inversion of a Boolean disjunction of the clip registers and the trivial accept mask.

37. The method of claim 36, wherein said performing Boolean operations on the bits in the one or more clip registers to determine whether the geometric primitive is entirely outside a clipping boundary further comprises:

performing Boolean AND operations on the one or more clip registers and a trivial reject mask.

38. The method of claim 36, wherein said testing vertices of the geometric primitive against the clipping boundary and said setting bits in one or more clip registers are performed by a first processing unit;

wherein said clip testing the geometric primitive using the bits in the one or more clip registers is performed by a second processing unit.

39. The method of claim 38, further comprising:

the second processing unit trivially accepting the geometric primitive for displaying if said clip testing concludes that the geometric primitive is entirely inside the clipping boundary;

the second processing unit trivially rejecting the geometric primitive for displaying if said clip testing concludes that the geometric primitive is entirely outside the clipping boundary;

clipping the geometric primitive if said clip testing concludes that the geometric primitive is not entirely inside and not entirely outside the clipping boundary.

40. The method of claim 39, further comprising:

the second processing unit sending an interrupt to the first processing unit if said clip testing concludes that the geometric primitive is not entirely inside and not entirely outside the clipping boundary.

41. The method of claim 40, wherein said clipping the geometric primitive further comprises the first processing unit clipping the geometric primitive after reading an exception register to determine a reason for the interrupt.

42. A method for preparing graphical data for display with a computer graphics system, the method comprising:

testing vertices of a geometric primitive against a clipping boundary, wherein the geometric primitive has one or more vertices;

setting bits in one or more clip registers according to said testing the vertices of the geometric primitive against the clipping boundary, wherein the one or more clip registers comprise one clip register for each of the one or more vertices of the geometric primitive;

clip testing the geometric primitive using the bits in the one or more clip registers;

wherein said clip testing the geometric primitive using the bits in the one or more clip registers further comprises:

performing Boolean operations on the bits in the one or more clip registers to determine whether the geometric primitive is entirely inside the clipping boundary;

performing Boolean operations on the bits in the one or more clip registers to determine whether the geometric primitive is entirely outside the clipping boundary;

wherein said performing Boolean operations on the bits in the one or more clip registers to determine whether the geometric primitive is entirely outside a clipping boundary further comprises:

performing Boolean AND operations on the one or more clip registers and a trivial reject mask.

43. The method of claim 42, wherein said testing vertices of the geometric primitive against the clipping boundary and said setting bits in one or more clip registers are performed by a first processing unit;

wherein said clip testing the geometric primitive using the bits in the one or more clip registers is performed by a second processing unit.

44. The method of claim 43, further comprising:

the second processing unit trivially accepting the geometric primitive for displaying if said clip testing concludes that the geometric primitive is entirely inside the clipping boundary;

the second processing unit trivially rejecting the geometric primitive for displaying if said clip testing concludes that the geometric primitive is entirely outside the clipping boundary;

clipping the geometric primitive if said clip testing concludes that the geometric primitive is not entirely inside and not entirely outside the clipping boundary.

45. The method of claim 44, further comprising:

the second processing unit sending an interrupt to the first processing unit if said clip testing concludes that the geometric primitive is not entirely inside and not entirely outside the clipping boundary.

46. The method of claim 45, wherein said clipping the geometric primitive further comprises the first processing unit clipping the geometric primitive after reading an exception register to determine a reason for the interrupt.

47. A method for preparing graphical data for display with a computer graphics system, the method comprising:

testing vertices of a geometric primitive against a clipping boundary, wherein the geometric primitive has one or more vertices;

setting bits in one or more clip registers according to said testing the vertices of the geometric primitive against the clipping boundary, wherein the one or more clip registers comprise one clip register for each of the one or more vertices of the geometric primitive;

clip testing the geometric primitive using the bits in the one or more clip registers;

wherein said testing vertices of the geometric primitive against the clipping boundary and said setting bits in one or more clip registers are performed by a first processing unit;

wherein said clip testing the geometric primitive using the bits in the one or more clip registers is performed by a second processing unit;

wherein the second processing unit trivially accepting the geometric primitive for displaying if said clip testing concludes that the geometric primitive is entirely inside the clipping boundary;

the second processing unit trivially rejecting the geometric primitive for displaying if said clip testing concludes that the geometric primitive is entirely outside the clipping boundary;

the second processing unit sending an interrupt to the first processing unit if said clip testing concludes that the geometric primitive is not entirely inside and not entirely outside the clipping boundary;

clipping the geometric primitive if said clip testing concludes that the geometric primitive is not entirely inside and not entirely outside the clipping boundary.

48. The method of claim 47, wherein said clipping the geometric primitive further comprises the first processing unit clipping the geometric primitive after reading an exception register to determine a reason for the interrupt.

49. A graphics system for preparing graphical data for display, the graphics system comprising:

one or more graphics processing units;

registers coupled to the one or more graphics processing units;

wherein the one or more graphics processing units are configured to:

test vertices of a geometric primitive against a clipping boundary, wherein the geometric primitive has one or more vertices;

set bits in one or more of the registers according to said testing the vertices of the geometric primitive against the clipping boundary, wherein the one or more registers comprise one clip register for each of the one or more vertices of the geometric primitive;

clip test the geometric primitive using the bits in the one or more clip registers;

wherein the one or more graphics processing units are further configured to:

trivially accept the geometric primitive for displaying if said clip testing concludes that the geometric primitive is entirely inside the clipping boundary;

trivially reject the geometric primitive for displaying if said clip testing concludes that the geometric primitive is entirely outside the clipping boundary;

send an interrupt if said clip testing concludes that the geometric primitive is not entirely inside and not entirely outside the clipping boundary;

clip the geometric primitive if said clip testing concludes that the geometric primitive is not entirely inside and not entirely outside the clipping boundary.

50. The graphics system of claim 49, wherein the registers include an exception register;

wherein in said clipping the geometric primitive, the one or more graphics processing units are further configured to clip the geometric primitive after reading the exception register to determine a reason for the interrupt.

51. The graphics system of claim 49, wherein the bits in the one or more clip registers comprise 6 bits for 6 regular clipping planes for each of the one or more vertices in the geometric primitive.

52. The graphics system of claim 51, wherein the bits in the one or more clip registers further comprise 4 bits for 4 guard band clipping planes for each of the one or more vertices in the geometric primitive.

53. The graphics system of claim 51, wherein the bits in the one or more clip registers further comprise bits for model clipping planes for each of the one or more vertices in the geometric primitive.

54. The graphics system of claim 49, wherein in said clip testing the geometric primitive using the bits in the one or more clip registers, the one or more graphics processing units are further configured to:

perform Boolean operations on the bits in the one or more clip registers to determine whether the geometric primitive is entirely inside the clipping boundary;

perform Boolean operations on the bits in the one or more clip registers to determine whether the geometric primitive is entirely outside the clipping boundary.

55. The graphics system of claim 54, wherein in said performing Boolean operations on the bits in the one or more clip registers to determine whether the geometric primitive is entirely inside a clipping boundary, the one or more graphics processing units are further configured to:

for a geometric primitive with one vertex, perform a Boolean AND operation on a Boolean inversion of the clip register and a trivial accept mask;

for a geometric primitive with two or three vertices, perform a Boolean AND operation on a Boolean inversion of a Boolean disjunction of the clip registers and the trivial accept mask.

56. The graphics system of claim 54, wherein in said performing Boolean operations on the bits in the one or more clip registers to determine whether the geometric primitive is entirely outside a clipping boundary, the one or more graphics processing units are further configured to:

perform Boolean AND operations on the one or more clip registers and a trivial reject mask.

57. A graphics system for preparing graphical data for display, the graphics system comprising:

one or more graphics processing units;

registers coupled to the one or more graphics processing units;

wherein the one or more graphics processing units are configured to:

test vertices of a geometric primitive against a clipping boundary, wherein the geometric primitive has one or more vertices;

set bits in one or more of the registers according to said testing the vertices of the geometric primitive against the clipping boundary, wherein the one or more registers comprise one clip register for each of the one or more vertices of the geometric primitive;

wherein the bits in the one or more clip registers comprise 6 bits for 6 regular clipping planes for each of the one or more vertices in the geometric primitive;

wherein the bits in the one or more clip registers further comprise 4 bits for 4 guard band clipping planes for each of the one or more vertices in the geometric primitive;

clip test the geometric primitive using the bits in the one or more clip registers.

58. The graphics system of claim 57, wherein the bits in the one or more clip registers further comprise bits for model clipping planes for each of the one or more vertices in the geometric primitive.

59. The graphics system of claim 57,
wherein in said clip testing the geometric primitive using the bits in the one or more clip registers, the one or more graphics processing units are further configured to:
perform Boolean operations on the bits in the one or more clip registers to determine whether the geometric primitive is entirely inside the clipping boundary;
perform Boolean operations on the bits in the one or more clip registers to determine whether the geometric primitive is entirely outside the clipping boundary.

60. The graphics system of claim 59,
wherein in said performing Boolean operations on the bits in the one or more clip registers to determine whether the geometric primitive is entirely inside a clipping boundary, the one or more graphics processing units are further configured to:
for a geometric primitive with one vertex, perform a Boolean AND operation on a Boolean inversion of the clip register and a trivial accept mask;
for a geometric primitive with two or three vertices, perform a Boolean AND operation on a Boolean inversion of a Boolean disjunction of the clip registers and the trivial accept mask.

61. The graphics system of claim 59,
wherein in said performing Boolean operations on the bits in the one or more clip registers to determine whether the geometric primitive is entirely outside a clipping boundary, the one or more graphics processing units are further configured to:
perform Boolean AND operations on the one or more clip registers and a trivial reject mask.

62. A graphics system for preparing graphical data for display, the graphics system comprising:
one or more graphics processing units;
registers coupled to the one or more graphics processing units;
wherein the one or more graphics processing units are configured to:
test vertices of a geometric primitive against a clipping boundary, wherein the geometric primitive has one or more vertices;
set bits in one or more of the registers according to said testing the vertices of the geometric primitive against the clipping boundary, wherein the one or more registers comprise one clip register for each of the one or more vertices of the geometric primitive;
wherein the bits in the one or more clip registers comprise 6 bits for 6 regular clipping planes for each of the one or more vertices in the geometric primitive;
wherein the bits in the one or more clip registers further comprise bits for model clipping planes for each of the one or more vertices in the geometric primitive;
clip test the geometric primitive using the bits in the one or more clip registers.

63. The graphics system of claim 62,
wherein in said clip testing the geometric primitive using the bits in the one or more clip registers, the one or more graphics processing units are further configured to:
perform Boolean operations on the bits in the one or more clip registers to determine whether the geometric primitive is entirely inside the clipping boundary;
perform Boolean operations on the bits in the one or more clip registers to determine whether the geometric primitive is entirely outside the clipping boundary.

64. The graphics system of claim 63,
wherein in said performing Boolean operations on the bits in the one or more clip registers to determine whether the geometric primitive is entirely inside a clipping boundary, the one or more graphics processing units are further configured to:
for a geometric primitive with one vertex, perform a Boolean AND operation on a Boolean inversion of the clip register and a trivial accept mask;
for a geometric primitive with two or three vertices, perform a Boolean AND operation on a Boolean inversion of a Boolean disjunction of the clip registers and the trivial accept mask.

65. The graphics system of claim 63;
wherein in said performing Boolean operations on the bits in the one or more clip registers to determine whether the geometric primitive is entirely outside a clipping boundary, the one or more graphics processing units are further configured to:
perform Boolean AND operations on the one or more clip registers and a trivial reject mask.

66. A graphics system for preparing graphical data for display, the graphics system comprising:
one or more graphics processing units;
registers coupled to the one or more graphics processing units;
wherein the one or more graphics processing units are configured to:
test vertices of a geometric primitive against a clipping boundary, wherein the geometric primitive has one or more vertices;
set bits in one or more of the registers according to said testing the vertices of the geometric primitive against the clipping boundary, wherein the one or more registers comprise one clip register for each of the one or more vertices of the geometric primitive;
clip test the geometric primitive using the bits in the one or more clip registers;
wherein in said clip testing the geometric primitive using the bits in the one or more clip registers, the one or more graphics processing units are further configured to:
perform Boolean operations on the bits in the one or more clip registers to determine whether the geometric primitive is entirely inside the clipping boundary;
perform Boolean operations on the bits in the one or more clip registers to determine whether the geometric primitive is entirely outside the clipping boundary;
wherein in said performing Boolean operations on the bits in the one or more clip registers to determine whether the geometric primitive is entirely inside a clipping boundary, the one or more graphics processing units are further configured to:
for a geometric primitive with one vertex, perform a Boolean AND operation on a Boolean inversion of the clip register and a trivial accept mask;
for a geometric primitive with two or three vertices, perform a Boolean AND operation on a Boolean inversion of a Boolean disjunction of the clip registers and the trivial accept mask.

67. The graphics system of claim 66,
wherein in said performing Boolean operations on the bits in the one or more clip registers to determine whether the geometric primitive is entirely outside a clipping boundary, the one or more graphics processing units are further configured to:
perform Boolean AND operations on the one or more clip registers and a trivial reject mask.

68. A graphics system for preparing graphical data for display, the graphics system comprising:
one or more graphics processing units;
registers coupled to the one or more graphics processing units;
wherein the one or more graphics processing units are configured to:
test vertices of a geometric primitive against a clipping boundary, wherein the geometric primitive has one or more vertices;
set bits in one or more of the registers according to said testing the vertices of the geometric primitive against the clipping boundary, wherein the one or more registers comprise one clip register for each of the one or more vertices of the geometric primitive;
clip test the geometric primitive using the bits in the one or more clip registers;
wherein in said clip testing the geometric primitive using the bits in the one or more clip registers, the one or more graphics processing units are further configured to:
perform Boolean operations on the bits in the one or more clip registers to determine whether the geometric primitive is entirely inside the clipping boundary;
perform Boolean operations on the bits in the one or more clip registers to determine whether the geometric primitive is entirely outside the clipping boundary;
wherein in said performing Boolean operations on the bits in the one or more clip registers to determine whether the geometric primitive is entirely outside a clipping boundary, the one or more graphics processing units are further configured to:
perform Boolean AND operations on the one or more clip registers and a trivial reject mask.

69. A carrier medium comprising program instructions for preparing graphical data for display with a computer graphics system, wherein the program instructions are executable to implement:
testing vertices of a geometric primitive against a clipping boundary, wherein the geometric primitive has one or more vertices;
setting bits in one or more clip registers according to said testing the vertices of the geometric primitive against the clipping boundary, wherein the one or more clip registers comprise one clip register for each of the one or more vertices of the geometric primitive;
clip testing the geometric primitive using the bits in the one or more clip registers;
trivially accepting the geometric primitive for displaying if said clip testing concludes that the geometric primitive is entirely inside the clipping boundary;
trivially rejecting the geometric primitive for displaying if said clip testing concludes that the geometric primitive is entirely outside the clipping boundary;
sending an interrupt if said clip testing concludes that the geometric primitive is not entirely inside and not entirely outside the clipping boundary;
clipping the geometric primitive if said clip testing concludes that the geometric primitive is not entirely inside and not entirely outside the clipping boundary.

70. The carrier medium of claim 69,
wherein in said clipping the geometric primitive, the program instructions are further executable to implement clipping the geometric primitive after reading an exception register to determine a reason for the interrupt.

71. The carrier medium of claim 69,
wherein the bits in the one or more clip registers comprise 6 bits for 6 regular clipping planes for each of the one or more vertices in the geometric primitive.

72. The carrier medium of claim 71,
wherein the bits in the one or more clip registers further comprise 4 bits for 4 guard band clipping planes for each of the one or more vertices in the geometric primitive.

73. The carrier medium of claim 71,
wherein the bits in the one or more clip registers further comprise bits for model clipping planes for each of the one or more vertices in the geometric primitive.

74. The carrier medium of claim 69,
wherein in said clip testing the geometric primitive using the bits in the one or more clip registers, the program instructions are further executable to implement:
performing Boolean operations on the bits in the one or more clip registers to determine whether the geometric primitive is entirely inside the clipping boundary;
performing Boolean operations on the bits in the one or more clip registers to determine whether the geometric primitive is entirely outside the clipping boundary.

75. The carrier medium of claim 74,
wherein in said performing Boolean operations on the bits in the one or more clip registers to determine whether the geometric primitive is entirely inside a clipping boundary, the program instructions are further executable to implement:
for a geometric primitive with one vertex, performing a Boolean AND operation on a Boolean inversion of the clip register and a trivial accept mask;
for a geometric primitive with two or three vertices, performing a Boolean AND operation on a Boolean inversion of a Boolean disjunction of the clip registers and the trivial accept mask.

76. The carrier medium of claim 74,
wherein in said performing Boolean operations on the bits in the one or more clip registers to determine whether the geometric primitive is entirely outside a clipping boundary, the program instructions are further executable to implement:
performing Boolean AND operations on the one or more clip registers and a trivial reject mask.

77. A carrier medium comprising program instructions for preparing graphical data for display with a computer graphics system, wherein the program instructions are executable to implement:
testing vertices of a geometric primitive against a clipping boundary, wherein the geometric primitive has one or more vertices;
setting bits in one or more clip registers according to said testing the vertices of the geometric primitive against the clipping boundary, wherein the one or more clip registers comprise one clip register for each of the one or more vertices of the geometric primitive;

wherein the bits in the one or more clip registers comprise 6 bits for 6 regular clipping planes for each of the one or more vertices in the geometric primitive;

wherein the bits in the one or more clip registers further comprise 4 bits for 4 guard band clipping planes for each of the one or more vertices in the geometric primitive;

clip testing the geometric primitive using the bits in the one or more clip registers.

78. The carrier medium of claim 77, wherein the bits in the one or more clip registers further comprise bits for model clipping planes for each of the one or more vertices in the geometric primitive.

79. The carrier medium of claim 77, wherein in said clip testing the geometric primitive using the bits in the one or more clip registers, the program instructions are further executable to implement:

performing Boolean operations on the bits in the one or more clip registers to determine whether the geometric primitive is entirely inside the clipping boundary;

performing Boolean operations on the bits in the one or more clip registers to determine whether the geometric primitive is entirely outside the clipping boundary.

80. The carrier medium of claim 79, wherein in said performing Boolean operations on the bits in the one or more clip registers to determine whether the geometric primitive is entirely inside a clipping boundary, the program instructions are further executable to implement:

for a geometric primitive with one vertex, performing a Boolean AND operation on a Boolean inversion of the clip register and a trivial accept mask;

for a geometric primitive with two or three vertices, performing a Boolean AND operation on a Boolean inversion of a Boolean disjunction of the clip registers and the trivial accept mask.

81. The carrier medium of claim 79, wherein in said performing Boolean operations on the bits in the one or more clip registers to determine whether the geometric primitive is entirely outside a clipping boundary, the program instructions are further executable to implement:

performing Boolean AND operations on the one or more clip registers and a trivial reject mask.

82. A carrier medium comprising program instructions for preparing graphical data for display with a computer graphics system, wherein the program instructions are executable to implement:

testing vertices of a geometric primitive against a clipping boundary, wherein the geometric primitive has one or more vertices;

setting bits in one or more clip registers according to said testing the vertices of the geometric primitive against the clipping boundary, wherein the one or more clip registers comprise one clip register for each of the one or more vertices of the geometric primitive;

wherein the bits in the one or more clip registers comprise 6 bits for 6 regular clipping planes for each of the one or more vertices in the geometric primitive;

wherein the bits in the one or more clip registers further comprise bits for model clipping planes for each of the one or more vertices in the geometric primitive;

clip testing the geometric primitive using the bits in the one or more clip registers.

83. The carrier medium of claim 82, wherein in said clip testing the geometric primitive using the bits in the one or more clip registers, the program instructions are further executable to implement:

performing Boolean operations on the bits in the one or more clip registers to determine whether the geometric primitive is entirely inside the clipping boundary;

performing Boolean operations on the bits in the one or more clip registers to determine whether the geometric primitive is entirely outside the clipping boundary.

84. The carrier medium of claim 83, wherein in said performing Boolean operations on the bits in the one or more clip registers to determine whether the geometric primitive is entirely inside a clipping boundary, the program instructions are further executable to implement:

for a geometric primitive with one vertex, performing a Boolean AND operation on a Boolean inversion of the clip register and a trivial accept mask;

for a geometric primitive with two or three vertices, performing a Boolean AND operation on a Boolean inversion of a Boolean disjunction of the clip registers and the trivial accept mask.

85. The carrier medium of claim 83, wherein in said performing Boolean operations on the bits in the one or more clip registers to determine whether the geometric primitive is entirely outside a clipping boundary, the program instructions are further executable to implement:

performing Boolean AND operations on the one or more clip registers and a trivial reject mask.

86. A carrier medium comprising program instructions for preparing graphical data for display with a computer graphics system, wherein the program instructions are executable to implement:

testing vertices of a geometric primitive against a clipping boundary, wherein the geometric primitive has one or more vertices;

setting bits in one or more clip registers according to said testing the vertices of the geometric primitive against the clipping boundary, wherein the one or more clip registers comprise one clip register for each of the one or more vertices of the geometric primitive;

clip testing the geometric primitive using the bits in the one or more clip registers;

wherein in said clip testing the geometric primitive using the bits in the one or more clip registers, the program instructions are further executable to implement:

performing Boolean operations on the bits in the one or more clip registers to determine whether the geometric primitive is entirely inside the clipping boundary;

performing Boolean operations on the bits in the one or more clip registers to determine whether the geometric primitive is entirely outside the clipping boundary;

wherein in said performing Boolean operations on the bits in the one or more clip registers to determine whether the geometric primitive is entirely inside a clipping boundary, the program instructions are further executable to implement:

for a geometric primitive with one vertex, performing a Boolean AND operation on a Boolean inversion of the clip register and a trivial accept mask;

for a geometric primitive with two or three vertices, performing a Boolean AND operation on a Boolean inversion of a Boolean disjunction of the clip registers and the trivial accept mask.

87. The carrier medium of claim 86,
wherein in said performing Boolean operations on the bits in the one or more clip registers to determine whether the geometric primitive is entirely outside a clipping boundary, the program instructions are further executable to implement:
performing Boolean AND operations on the one or more clip registers and a trivial reject mask.

88. A carrier medium comprising program instructions for preparing graphical data for display with a computer graphics system, wherein the program instructions are executable to implement:
testing vertices of a geometric primitive against a clipping boundary, wherein the geometric primitive has one or more vertices;
setting bits in one or more clip registers according to said testing the vertices of the geometric primitive against the clipping boundary, wherein the one or more clip registers comprise one clip register for each of the one or more vertices of the geometric primitive;
clip testing the geometric primitive using the bits in the one or more clip registers;
wherein in said clip testing the geometric primitive using the bits in the one or more clip registers, the program instructions are further executable to implement:
performing Boolean operations on the bits in the one or more clip registers to determine whether the geometric primitive is entirely inside the clipping boundary;
performing Boolean operations on the bits in the one or more clip registers to determine whether the geometric primitive is entirely outside the clipping boundary;
wherein in said performing Boolean operations on the bits in the one or more clip registers to determine whether the geometric primitive is entirely outside a clipping boundary, the program instructions are further executable to implement:
performing Boolean AND operations on the one or more clip registers and a trivial reject mask.

89. A graphics system for preparing graphical data for display, the graphics system comprising:
one or more graphics processing units;
registers coupled to the one or more graphics processing units;
a memory coupled to the one or more graphics processing units, wherein the memory includes program instructions executable by the one or more graphics processing units to:
test vertices of a geometric primitive against a clipping boundary, wherein the geometric primitive has one or more vertices;
set bits in one or more of the registers according to said testing the vertices of the geometric primitive against the clipping boundary, wherein the one or more registers comprise one clip register for each of the one or more vertices of the geometric primitive;
wherein the bits in the one or more clip registers comprise 6 bits for 6 regular clipping planes for each of the one or more vertices in the geometric primitive;
wherein the bits in the one or more clip registers further comprise 4 bits for 4 guard band clipping planes for each of the one or more vertices in the geometric primitive;
clip test the geometric primitive using the bits in the one or more clip registers.
trivially accept the geometric primitive for displaying if said clip testing concludes that the geometric primitive is entirely inside the clipping boundary;
trivially reject the geometric primitive for displaying if said clip testing concludes that the geometric primitive is entirely outside the clipping boundary;
clip the geometric primitive if said clip testing concludes that the geometric primitive is not entirely inside and not entirely outside the clipping boundary.

90. The graphics system of claim 89,
wherein the bits in the one or more clip registers further comprise bits for model clipping planes for each of the one or more vertices in the geometric primitive.

91. The graphics system of claim 89,
wherein in said testing the vertices of the geometric primitive against a clipping boundary, the program instructions are further executable to:
determine whether each vertex is inside the clipping boundary with respect to each of a plurality of clipping planes;
wherein in said setting bits in one or more clip registers according to said testing the vertices of the geometric primitive against the clipping boundary, the program instructions are further executable to:
for each vertex and each clipping plane, set a corresponding bit to a value of zero if the vertex is inside the clipping boundary with respect to the clipping plane;
for each vertex and each clipping plane, set the corresponding bit to a value of one if the vertex is outside the clipping boundary with respect to the clipping plane;
wherein each bit corresponds to one vertex and one clipping plane.

92. The graphics system of claim 89, further comprising:
a display device;
wherein the program instructions are further executable to:
display the geometric primitive on the display device if said clip testing concludes that the geometric primitive is entirely inside the clipping boundary;
display a clipped form of the geometric primitive on the display device if said clip testing concludes that the geometric primitive is not entirely inside and not entirely outside the clipping boundary.

93. A graphics system for preparing graphical data for display, the graphics system comprising:
a first graphics processing unit;
a second graphics processing unit;
registers coupled to the graphics processing units;
wherein the first graphics processing unit is configured to:
test vertices of a geometric primitive against a clipping boundary, wherein the geometric primitive has one or more vertices;
set bits in one or more of the registers according to said testing the vertices of the geometric primitive against the clipping boundary, wherein the one or more registers comprise one clip register for each of the one or more vertices of the geometric primitive;
wherein the second graphics processing unit is configured to:

clip test the geometric primitive using the bits in the one or more clip registers.

94. The graphics system of claim 93, wherein the second graphics processing unit is further configured to:
   trivially accept the geometric primitive for displaying if said clip testing concludes that the geometric primitive is entirely inside the clipping boundary;
   trivially reject the geometric primitive for displaying if said clip testing concludes that the geometric primitive is entirely outside the clipping boundary;

wherein the first graphics processing unit is further configured to:
   clip the geometric primitive if said clip testing concludes that the geometric primitive is not entirely inside and not entirely outside the clipping boundary.

95. The graphics system of claim 94, wherein the second graphics processing unit is further configured to:
   send an interrupt before said clipping the geometric primitive if said clip testing concludes that the geometric primitive is not entirely inside and not entirely outside the clipping boundary.

96. The graphics system of claim 95, wherein the registers include an exception register;

wherein in said clipping the geometric primitive, the first graphics processing unit is further configured to clip the geometric primitive after reading the exception register to determine a reason for the interrupt.

* * * * *